(12) United States Patent
Bossard et al.

(10) Patent No.: US 11,781,507 B2
(45) Date of Patent: Oct. 10, 2023

(54) MULTI-MODE COMBINED CYCLE PROPULSION ENGINE

(71) Applicant: ATRX, Inc., Huntsville, AL (US)

(72) Inventors: John A Bossard, Huntsville, AL (US); John L Bergmans, Huntsville, AL (US)

(73) Assignee: ATRX, Inc., Huntsville, AL (US)

( * ) Notice: Subject to any disclaimer, the term of this patent is extended or adjusted under 35 U.S.C. 154(b) by 0 days.

(21) Appl. No.: 17/853,691

(22) Filed: Jun. 29, 2022

(65) Prior Publication Data

US 2023/0003135 A1 Jan. 5, 2023

Related U.S. Application Data

(60) Provisional application No. 63/216,489, filed on Jun. 29, 2021.

(51) Int. Cl.
| | | |
|---|---|---|
| F02K 7/16 | (2006.01) | |
| F02K 3/10 | (2006.01) | |
| F01D 9/04 | (2006.01) | |
| F02K 9/78 | (2006.01) | |
| F02K 9/48 | (2006.01) | |
| F02K 9/08 | (2006.01) | |
| F02K 9/30 | (2006.01) | |
| F02K 9/42 | (2006.01) | |
| F02K 3/12 | (2006.01) | |
| F02K 9/26 | (2006.01) | |
| F02K 9/97 | (2006.01) | |

(Continued)

(52) U.S. Cl.
CPC ............... *F02K 7/16* (2013.01); *F01D 9/041* (2013.01); *F02K 3/10* (2013.01); *F02K 3/12* (2013.01); *F02K 7/18* (2013.01); *F02K 9/08* (2013.01); *F02K 9/26* (2013.01); *F02K 9/30* (2013.01); *F02K 9/42* (2013.01); *F02K 9/48* (2013.01); *F02K 9/76* (2013.01); *F02K 9/78* (2013.01); *F02K 9/97* (2013.01); *F05D 2220/74* (2013.01); *F05D 2240/128* (2013.01); *F05D 2240/35* (2013.01)

(58) Field of Classification Search
CPC .... F02C 7/27; F02C 7/272; F02C 5/04; F02C 6/003; F02K 3/10; F02K 3/11; F02K 7/16; F01D 9/041
See application file for complete search history.

(56) References Cited

U.S. PATENT DOCUMENTS 2,936,586 A * 5/1960 Schilling .................. F02C 7/264
251/16
2,968,146 A * 1/1961 Howell ...................... F02K 7/16
60/262

(Continued)

*Primary Examiner* — Andrew H Nguyen
(74) *Attorney, Agent, or Firm* — Patent Grove AB; Tomas Friend (57) ABSTRACT

A turbojet engine capable of operation in an Air Turbo Rocket (ATR) mode includes a compressor, a rotatable turbine wheel comprising turbine blades, a non-rotating guide vane ring comprising guide vanes, a turbine shaft configured to power said compressor, a combustor, a gas generator, and a main combustor. The main combustor is configured to combust hot, fuel rich gas from the gas generator in air compressed by the compressor. Hot, fuel rich gas from the gas generator is directed towards the turbine blades by a directing means.

18 Claims, 9 Drawing Sheets

(51) Int. Cl.
*F02K 7/18* (2006.01)
*F02K 9/76* (2006.01)

(56) References Cited

U.S. PATENT DOCUMENTS

| | | | | |
|---|---|---|---|---|
| 2,989,848 A * | 6/1961 | Paiement | .................. | F02C 7/27 415/115 |
| 3,016,698 A * | 1/1962 | Sobey | ..................... | F02K 3/075 60/761 |
| 4,085,583 A * | 4/1978 | Klees | ....................... | F02K 3/075 60/761 |
| 4,815,277 A * | 3/1989 | Vershure, Jr | ........... | B64D 41/00 60/39.461 |
| 4,819,423 A * | 4/1989 | Vershure, Jr | ........... | B64D 41/00 60/778 |
| 4,934,136 A * | 6/1990 | Weigand | ................. | F02C 7/277 60/773 |
| 5,341,640 A * | 8/1994 | Faulkner | .................. | F02K 3/10 60/761 |
| 2003/0221409 A1* | 12/2003 | McGowan | ................ | F02C 3/30 60/734 |
| 2007/0271898 A1* | 11/2007 | Little | ....................... | F02C 6/18 60/39.182 |
| 2015/0007549 A1* | 1/2015 | Bossard | .................... | F02K 9/78 60/246 |

* cited by examiner (PRIOR ART)

MULTI-MODE COMBINED CYCLE PROPULSION ENGINE

BACKGROUND OF THE INVENTION

Field of the Invention

The invention relates to increasing the thrust output of turbojet engines for aircraft and other aerospace vehicles by providing a turbojet or an afterburning turbojet with an Air Turbo Rocket (ATR) mode of operation and modifying an existing turbojet or afterburning turbojet engine to be capable of operating in an ATR mode.

Description of Related Art

Turbojet engines have a long history of new technological innovations being added to the basic turbojet engine in order to provide enhanced performance or capabilities that were otherwise unachievable with the existing configurations. By adding an afterburner to an existing turbojet, for example, the maximum thrust can be significantly augmented. A General Electric J85-GE-21 afterburning turbojet generates 3,500 lbf thrust with the afterburner off and 5,000 lbf thrust, or 43% more thrust, with the afterburner on and can operate with the afterburner section turned off or on.

While an afterburning turbojet produces a great deal of thrust, there remains a need for propulsion systems that can provide higher thrust-to-weight ratios, and thus enable aerospace vehicles to fly at higher flight speeds and altitudes, compared with existing afterburning turbojets.

An air-turborocket, or Air Turbo Rocket (ATR), also known as an air-turboramjet, a fan-boosted ramjet, and gas generator turbojet motor, is a turbojet engine in which ram air compression is supplemented by a compressor powered by a turbine that is driven by the exhaust of a gas generator using a fuel rich liquid or solid propellant. The turbine exhaust gases constitute the fuel, which is burned with compressed air behind the turbine. While the ATR provides certain advantages relative to turbojets, including high speed flight and high thrust to weight ratio, the ratio of thrust to propellant flowrate is lower than that of turbojet engines.

BRIEF SUMMARY OF THE INVENTION

Accordingly, examples of the present invention preferably seek to mitigate, alleviate or eliminate one or more deficiencies, disadvantages or issues in the art, such as the above-identified, singly or in any combination by providing a device according to the appended patent claims.

In one aspect, the present invention provides an engine, named an Overjet engine, that is capable of operating in an Air Turbo Rocket (ATR) propulsion mode in addition to a turbojet mode and/or afterburning turbojet mode. A turbojet or afterburning turbojet with an ATR mode resembles its conventional counterpart, but with improved performance depending on the mode of operation. Improved performance comprises at least one of greater thrust and the ability to fly at higher altitudes in ATR mode when compared with a turbojet or an afterburning turbojet. The ability to selectively operate in a turbojet mode, an afterburner mode, and/or an ATR mode selectively provides the advantages of turbojet modes of operation and ATR mode operation in the same engine. While operating in turbojet mode, for example, an Overjet engine generates less thrust and is more fuel efficient than an ATR engine or an Overjet operating in an ATR mode.

In another aspect, the invention provides a method for operating an Overjet engine in turbojet mode, afterburning turbojet mode, ATR mode, and optionally combinations of these.

In yet another aspect, the present invention provides a Duplex Turbine Guide Vane (DTVG) and a turbine assembly comprising DTVGs. A DTGV provides a means for directing hot, fuel rich gas from a gas generator onto the blades of a turbine.

In yet another aspect, the present invention provides an ATR comprising a turbine assembly comprising DTGVs.

In yet another aspect, the present invention provides for a method for modifying an existing turbojet or afterburning turbojet to provide it with an ATR mode of operation.

BRIEF DESCRIPTION OF THE DRAWINGS

These and other aspects, features, and advantages of which examples of the invention are capable of will be apparent and elucidated from the following description of embodiments of the present invention, reference being made to the accompanying drawings, in which.

DETAILED DESCRIPTION OF THE INVENTION

Specific examples of the disclosure will now be described with reference to the Accompanying drawings. This disclosure may, however, be embodied in many different forms and should not be construed as limited to the examples set forth herein; rather, these examples are provided so that this disclosure will be thorough and complete, and will fully convey the scope of the disclosure to those skilled in the art.

The terminology used in the detailed description of the examples illustrated in the accompanying drawings is not intended to be limiting of the disclosure.

As used herein, the term "gas generator" means a gas generator that does not use air and the contents of the gas generator are isolated from exposure to air.

Figure 1A:
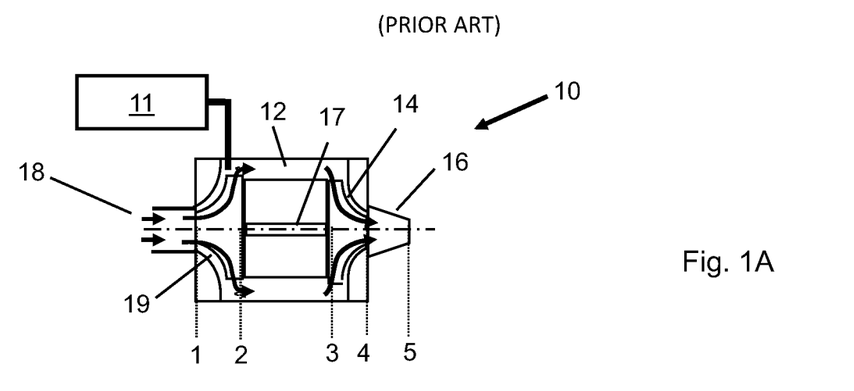
FIG. 1A is a schematic view of a prior art turbojet.
Figure 1B:
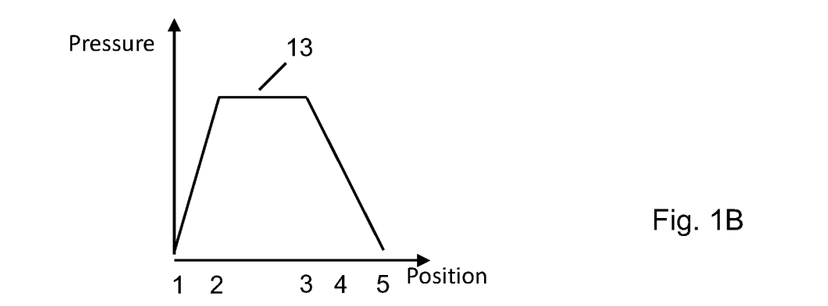
FIG. 1B is a graphical representation of a pressure profile of a prior art turbojet.
Figure 1C:
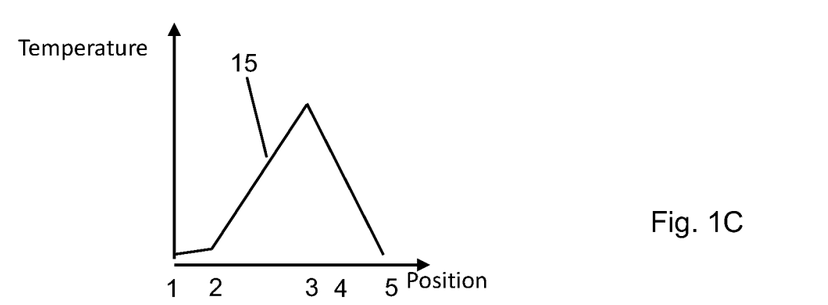
FIG. 1C is a graphical representation of a temperature profile of a prior art turbojet.
Figure 2A:
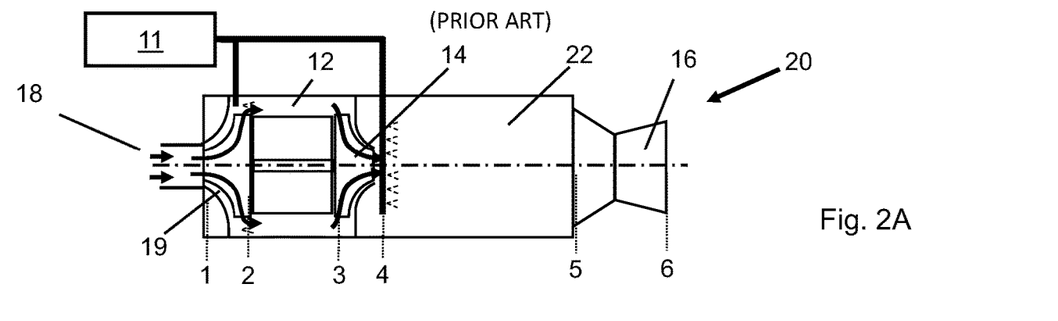
FIG. 2A is a schematic view of a prior art afterburning turbojet.

A turbojet 10 and an afterburning turbojet 20 are shown schematically in FIGS. 1A and 2A, respectively. Both engines comprise an air inlet 18, a compressor 19, a combustor 12, a turbine 14, and a nozzle 16. Air enters the engine through the air inlet 18, which corresponds to a relative position in the turbojet assigned position 1. Positions 1-5 in FIGS. 1A-2C correspond to relative positions in the turbojet 10 and afterburning turbojet 20 and are intended as an aid to explain technical effects of certain technical features of the invention. During normal operation of both the turbojet 10 and afterburning turbojet 20, air is pressurized as it passes through the compressor 19 (positions 1 to 2) and the compressed air enters the combustor 12 where it mixes with fuel 11 and combustion occurs (positions 2-3). A stream of hot, high-pressure gas consisting primarily of air with combustion products expands over the turbine 14 which, in turn, drives the compressor 19 via shaft 17 (positions 3-4). In a turbojet 10, remaining pressure is expanded through the nozzle 16 to generate thrust (positions 4-5). As can be seen in FIG. 1B, pressure in a turbojet reaches a maximum at positions 2-3 after incoming air has been compressed and during combustion. Pressure then drops as combustion exhaust drives the turbine 14 and exits through the nozzle 16. FIG. 1C illustrates the temperature profile for a turbojet 10 in which temperature rises slightly during compression and then sharply in the combustor 12 before decreasing again as exhaust gas expands through the nozzle 16.

In an afterburning turbojet 20, gas exiting the turbine 14 enters the afterburner 22, where additional fuel is mixed with the gas and burned to raise the temperature to a temperature higher than the temperature in the combustor 12. Combustion products then expand through the exhaust nozzle 16 to produce thrust at a magnitude considerably greater than that produced by a non-afterburning turbojet.

Figure 2B:
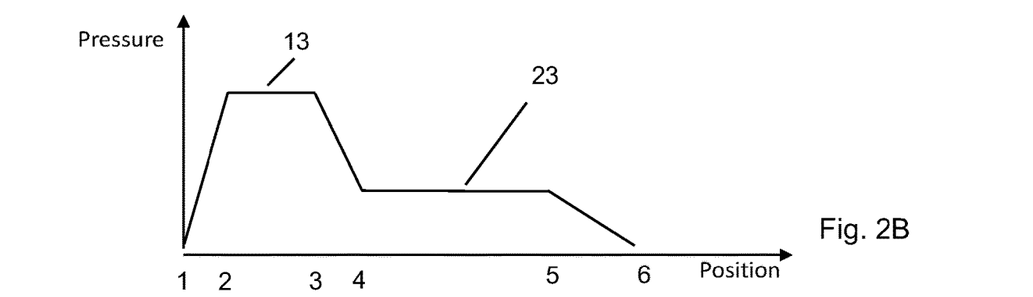
FIG. 2B is a graphical representation of a pressure profile of a prior art afterburning turbojet.
Figure 2C:
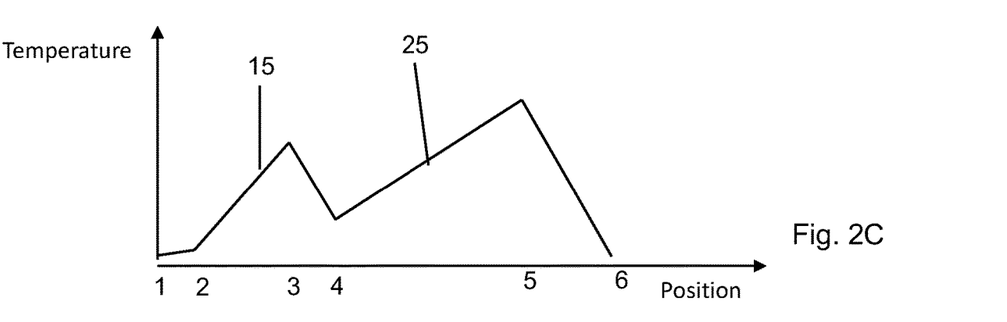
FIG. 2C is a graphical representation of a temperature profile of a prior art afterburning turbojet.

FIGS. 2B and 2C show pressure and temperature profiles for an afterburning turbojet 20 in which the afterburner 22 maintains a pressure lower than the combustor but achieves a higher maximum temperature.

In contrast to a turbojet, which uses power extracted from a reaction of fuel with air in the combustor 12 to drive the compressor 19, an ATR 30 (FIG. 3A) uses an independent gas source, such as a gas generator external to the combustor 12 to produce a hot, high-pressure, fuel-rich gas to drive turbine 14 and, in turn, the compressor 19. Air exiting the compressor does not expand through a turbine and, instead, passes directly into a main combustion chamber 32 and, as a consequence, retains a higher gas pressure at the nozzle 16 when compared with a turbojet with an afterburner.

Figure 3A:
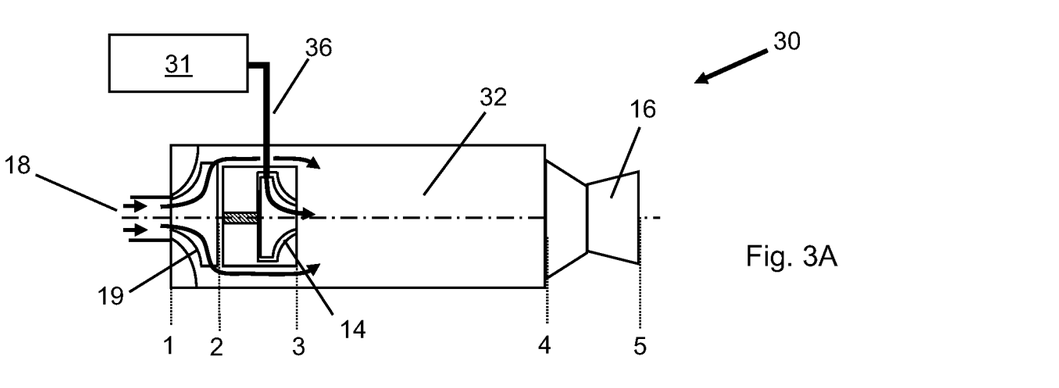
FIG. 3A is a schematic view of one embodiment of an Air Turbo Rocket (ATR)

FIG. 3A is a schematic view of one embodiment of an ATR 30 comprising an air inlet 18, a compressor 19, a gas generator 31, a gas delivery conduit 36, a turbine 14, a main combustor 32, and a nozzle 16. Air entering at the inlet 18 is pressurized as it passes through the compressor 19 (positions 1-2 in FIGS. 3A-3C) and passes directly into the main combustor (indicated by arrows outside the turbine 14 terminating between positions 3 and 4) without passing through the turbine 14. Hot, high-pressure, fuel-rich gas produced in the gas generator 31 enters the turbine 14 via gas delivery conduit 36 and drives the turbine which, in turn, powers the shaft that drives the compressor 19. Compressed air from the compressor 19 and high-pressure, fuel-rich gas from the gas generator 31 via the turbine 14 mix in the main combustor 32 and combust to generate thrust as combustion products accelerate during the expansion process to atmospheric pressure through the nozzle 16 (stations 4 to 5). The position of the gas generator 31 is shown above the turbine 14 and outside the turbine and main combustor 32 but the gas generator may be positioned in proximity to, and forward or aft exterior to, the turbine assembly 14 and main combustor 32. It is also possible to position the gas generator 31 inside the main combustor 32, although this location is not preferred.

The ATR main combustor 32 operates differently from a turbojet afterburner 22. One significant difference is that the pressure in the ATR main combustor 32 is higher than that of the turbojet afterburner 22, as indicated by comparing FIGS. 2B and 2C with FIGS. 3B and 3C. The pressure in the ATR main combustor is higher because air enters the combustor immediately after passing through the compressor 19 and is not expanded across the turbine 14.

Figure 3B:
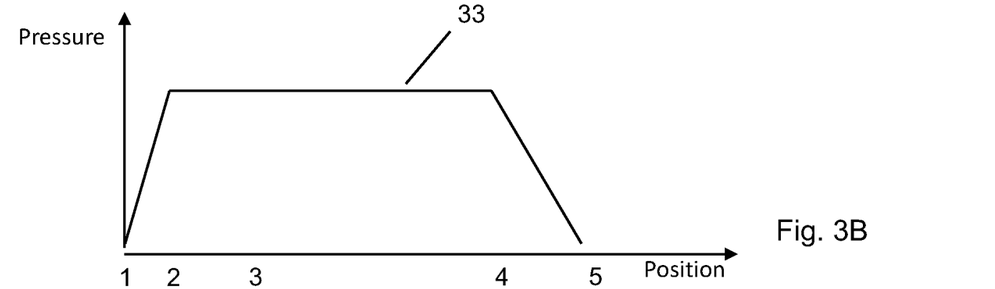
FIG. 3B is a graphical representation of a pressure profile of one embodiment of ATR.

FIGS. 2B and 3B are rough pressure profiles of an operating afterburning turbojet 20 and an ATR 30, respectively. The combustor pressure 13 between positions 2 and 3 in FIG. 2B is higher than the afterburner pressure 23 between positions 4 and 5 because air loses pressure as it drives the turbine 14 (positions 3 to 4). The main combustor pressure 33 between positions 2 and 4 in FIG. 3B is higher than the afterburner pressure 23 between positions 4 and 5 because incoming air from the compressor 19 bypasses the turbine 14. The pressure profiles are intended to convey the principle behind the improved performance provided by the ATR and are not intended to convey precise relative pressures in the different segments of the engines.

An ATR main combustor 32 may operate at approximately twice the pressure of a turbojet afterburner. As a result, for the same air flowrate and compressor pressure ratio, the ATR generates approximately twice the thrust of an afterburning turbojet. The higher pressure of the combustion products in the ATR main combustor 32, even at the same temperature, produce more thrust than a similar sized afterburning turbojet.

Figure 3C:
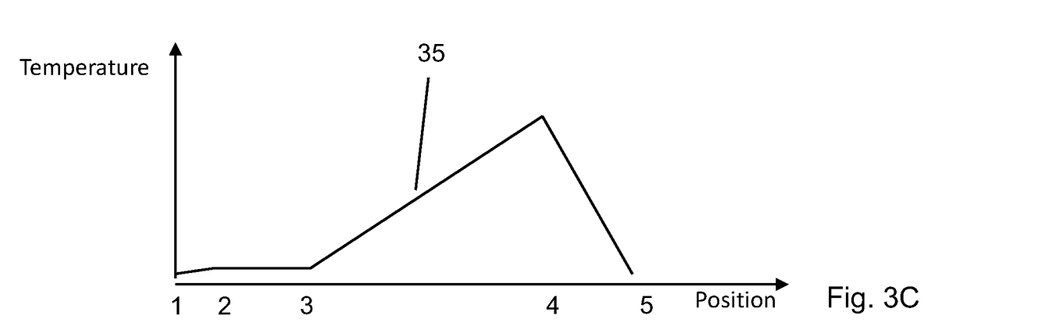
FIG. 3C is a graphical representation of a temperature profile of one embodiment of an ATR.

FIGS. 2C and 3C are rough temperature profiles of an operating afterburning turbojet 20 and an ATR 30, respectively. Combustor air temperature 15 between positions 2 and 3 in the afterburning turbojet is higher than the temperature between positions 2 and 3 in the ATR because, in the ATR, no combustion takes place between the compressor 19 and the turbine 14. Afterburner temperature 25 and main combustor temperature 35 are both higher than the combustor temperature 15 but the temperature at the inlet of turbine 14 is typically at a relatively lower temperature in the ATR 30 than the turbojet 10 and afterburning turbojet 20.

Figure 5A:
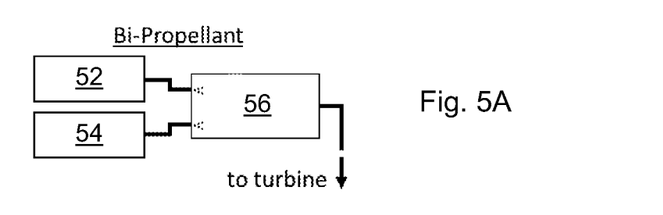
FIGS. 5A-5C are schematic representations of three embodiments of ATR gas generator configurations.
Figure 5B:
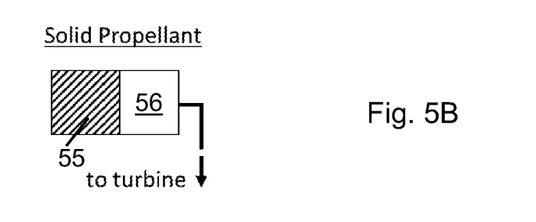
Figure 5C:
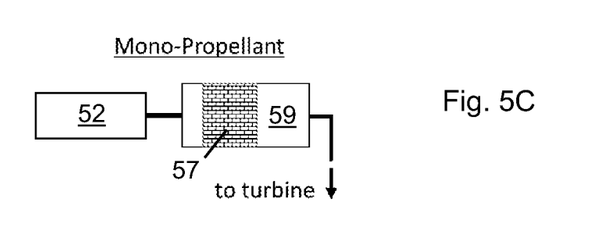

The ATR gas generator 31 produces a fuel-rich turbine drive gas by a suitable gas generating means. Three exemplary types of gas generating means are depicted in FIGS. 5A-5C. For a bi-propellant type embodiment (FIG. 5A), a fuel-rich mixture of liquid or gaseous fuel 52 and oxidizer 54 are combusted in a combustion chamber 56 to produce high-pressure, fuel-rich combustion product gas. Combustion of a solidified fuel-rich mixture 55 of fuel and oxidizer in a combustion chamber 56 may be used as a gas generating means to produce high-pressure, fuel-rich combustion product gas (FIG. 5B). A mono-propellant type gas generating means may comprise a fuel 52 and a gas generation chamber 59 comprising a catalyst 57 that causes fuel contacting the catalyst to decompose via deflagration or burn via incomplete combustion to produce high-pressure, fuel-rich gas (FIG. 5C). In all of these examples, the gas generator 31 does not use air and the contents of the gas generator are isolated from exposure to air.

Figure 4A:
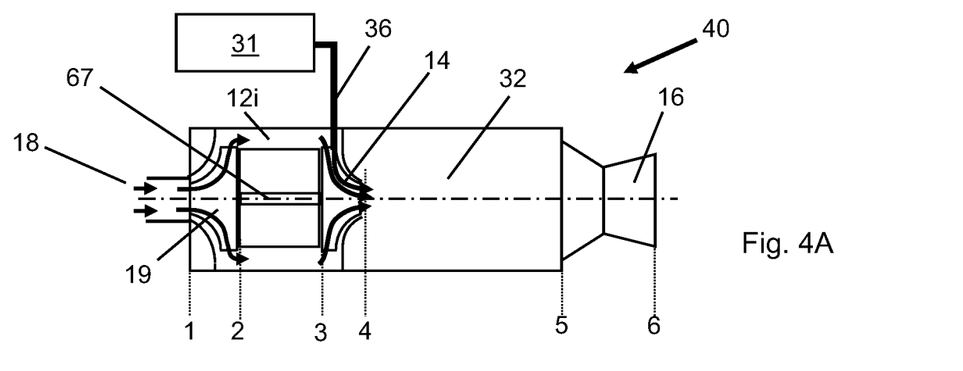
FIG. 4A is a schematic view of one embodiment of a turbojet comprising an ATR mode of operation.

FIG. 4A depicts an embodiment of a turbojet or afterburning turbojet configured for, or modified to enable, operation in an ATR mode. This configuration is also called an Overjet 40 and differs from the ATR shown in FIG. 3A by the presence of a combustor 12$i$ between the compressor 19 and the turbine, or turbine assembly 14. An Overjet comprises a gas generating means for producing an independent source of fuel-rich turbine drive gas, such as a gas generator 31 and a high-pressure mode afterburner, or a main combustor 32. A high-pressure mode afterburner may be an afterburner of an afterburning turbojet 20 that serves as main combustor 32. The position of the gas generator 31 is shown above the turbine 14 and outside the turbine and main combustor 32 but the gas generator may be positioned suitably in proximity to and forward or aft exterior to the turbine assembly 14 and main combustion chamber 32. The Overjet 40 comprises a gas delivery conduit 36 that delivers hot, fuel rich gas to the turbine 14, which comprises a means for directing the hot, fuel rich gas from a gas generator 31 onto blades of the turbine 14 as described below with respect to Duplex Turbine Guide Vanes (DTGVs) in FIGS. 6 through 9B. Additionally or alternatively, the Overjet may comprise different means for directing the hot, fuel rich gas from a gas generator 31 onto blades of the turbine 14 to be described in more detail elsewhere in the disclosure.

An Overjet 40 may be configured to switch, on-demand, between three operating modes including a non-afterburning turbojet mode, an afterburner mode, and an ATR mode. Mode switching capability enables an operator to select engine thrust levels and propellant consumption to meet a wide spectrum of flight vehicle requirements. This mode transition can be configured to be continuous or abrupt, and multiple modes may be operated in parallel.

In non-afterburning turbojet mode, air compressed by compressor 19 is mixed with fuel and lean fuel combustion occurs in combustor 12$i$ with turbine 14 being driven by expansion of combustion products through the turbine. In this mode, fuel is supplied to combustor 12$i$ from a source similar to fuel supply 11 of a turbojet 10. In afterburner mode, additional fuel is delivered to the afterburner/main combustor 32 for combustion at normal afterburner pressure. In afterburner mode, this additional fuel is supplied to afterburner/main combustor 32 from fuel supply 11 as shown in FIG. 2A of an afterburning turbojet 20 or, less preferably, from a separate fuel supply.

In ATR mode, air enters the air inlet 18 at position 1 and is compressed by the compressor 19. The air flowrate and compressor pressure ratio in ATR-mode are the same as, or similar to, turbojet and afterburner modes. Air enters the combustor 12$i$, which is inactive and, as a result, there is no temperature increase of the air when passing from positions 2 to 3. There is little to no drop in air pressure as air passes through the turbine 14 (positions 3 to 4) since no power is being extracted from this air flow. Instead, power to drive the compressor 19 comes from the gas generator 31. A small pressure drop may occur as the air flows through the combustor 12 due to flow restrictions within this component. A hot, high-pressure fuel-rich gas from the gas generator 31 passes through the gas delivery conduit 36 to the turbine 14 which, in turn, provides shaft power to drive the compressor 19. The fuel-rich turbine drive gas exits the turbine at position 4 and mixes and burns in the afterburner/main combustor 32 with air from the compressor, resulting in a high-pressure, high-temperature mixture of air and combustion products at position 5. This mixture accelerates as it expands through the engine nozzle 16 to ambient pressure at position 6 to produce thrust.

Figure 4B:
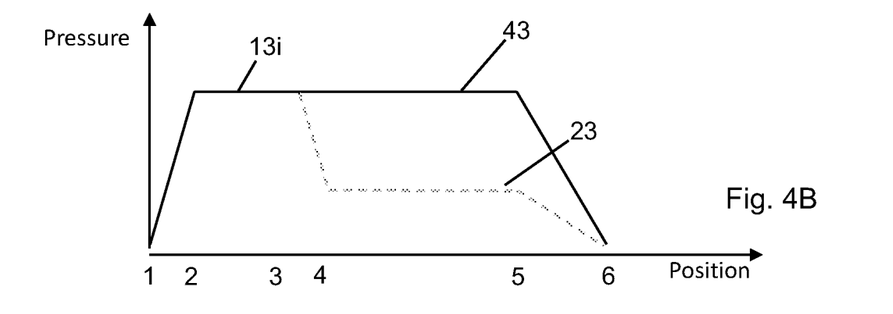
FIG. 4B is a graphical representation of a pressure profile of the embodiment in FIG. 4A.

FIG. 4B is a pressure profile graph comparing an Overjet pressure profile in ATR mode (solid line) with an afterburning turbojet pressure profile (dashed line). Pressure between positions 2 and 5 in ATR mode remain high as indicated by non-combusting combustor pressure 13$i$ and afterburner/main combustor pressure 43. By comparison, afterburner pressure 23 for an afterburning turbojet is lower than afterburner/main combustor pressure 43. The pressure profiles in the afterburner differ greatly, with the ATR mode having a pressure about twice as high at position 5 as in afterburner mode.

Figure 4C:
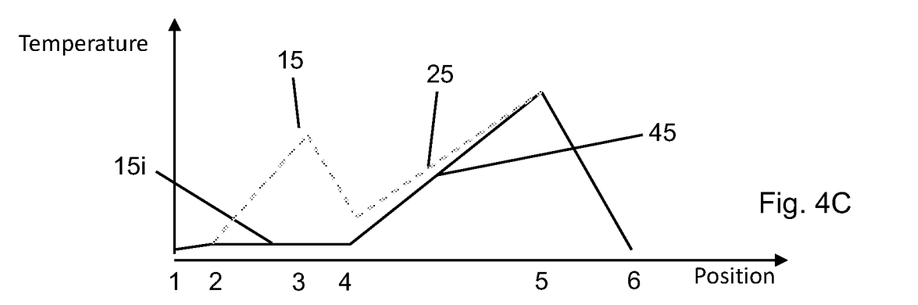
FIG. 4C is a graphical representation of a temperature profile the embodiment in FIG. 4A.

FIG. 4C is a temperature profile graph comparing an Overjet pressure profile (solid line) with an afterburning turbojet temperature profile (dashed line). Non-combusting combustor temperature 15$i$ in ATR mode is lower than operating combustor temperature in an afterburning turbojet and afterburner/main combustor temperature 45 in ATR mode is approximately the same as afterburner temperature 25 in afterburner mode. Comparing the temperature profiles in the turbojet afterburner and ATR afterburner/main combustor 32, the peak temperature of both profiles is the same (position 5).

In Table 1, a comparison of Overjet performance relative to a comparably-sized turbojet, afterburning turbojet, and ATR engine is shown. Thrust levels, propellant flowrates and specific impulse are for an Overjet based on a General Electric J85-GE-21 engine.

TABLE 1

Overjet Performance Comparison with Turbojet, ATR, and Rocket Engine

| Engine | Mode | Thrust | | | Propellant Flowrate | | | Air Flowrate (lbm/sec) | Total Flow Out (lbm/sec) | Specific Impulse (lbf · sec/lbm) | Specific Thrust (lbf · sec/lbm) |
|---|---|---|---|---|---|---|---|---|---|---|---|
| | | lbf | Relative to Turbojet Mode | Relative to Afterburner Mode | lbm/sec | Relative to Turbojet Mode | Relative to Afterburner Mode | | | | |
| Overjet | Turbojet | 3,500 | 1.0 | 0.7 | 0.7 | 1.0 | 0.3 | 45.0 | 45.7 | 4,701 | 78 |
| | Afterburner | 5,000 | 1.4 | 1.0 | 2.5 | 3.4 | 1.0 | 45.0 | 47.5 | 2,000 | 111 |
| | ATR | 7,000 | 2.0 | 1.4 | 7.0 | 9.4 | 2.8 | 45.0 | 52.0 | 1,000 | 156 |
| Air Turbo Rocket | | 10,500 | 3.0 | 2.1 | 8.8 | 11.8 | 3.5 | 67.3 | 76.1 | 1,200 | 156 |
| Rocket | | 7,000 | 2.0 | 1.4 | 20.0 | 26.9 | 8.0 | N/A | 28.0 | 350 | N/A |

The relative thrust and flowrate columns in this table compare each engine configuration to that of a GE-J85-21-based Overjet in turbojet and afterburner modes. The last two rows of Table 1 include performance values for an ATR of a similar size to the J85 and a rocket of the same thrust level as the Overjet in ATR mode. A liquid hydrocarbon-based fuel is assumed for each engine in the table.

Using thrust and propellant flowrate values for a General Electric J85-GE-21-based Overjet (Table 1), at least two differences in performance characteristics between afterburner mode and ATR-mode are apparent. Engine thrust in ATR mode is approximately 1.4 times higher than in afterburning mode. The higher thrust is due to the higher afterburner pressure in ATR mode at the same exit temperature and approximately the same total flowrate. Also, propellant flowrate in ATR mode is approximately 2.8 times higher than afterburner mode since all of the power to drive the compressor in ATR mode must be provided by the independent turbine drive gas.

Although engine thrust increases less than the propellant flowrate when switching the Overjet from afterburner to ATR mode, the specific impulse of an Overjet in ATR mode is still 1000 lbf·sec/lbm, which is well in excess of the typical Isp of 350 lbf·sec/lbm of a hydrocarbon-fueled rocket. In other words, the propellant flowrate of an Overjet in ATR mode using a hydrocarbon fuel is 35% that of a hydrocarbon-fueled rocket of the same thrust output.

This relatively high specific impulse in ATR mode means that one application for which the Overjet is well-suited is to provide an aircraft with a short boost of high thrust, for example to reach the edge of space, without the added complexity and high fuel consumption of a separate rocket motor.

The ATR mode of an Overjet uses an external source of hot, high-pressure turbine drive gas as a substitute for the turbine drive gas produced by the turbojet combustor in turbojet or afterburner modes. Any of the external gas sources used in an ATR are suitable for use as an external source of turbine drive gas in an Overjet.

In ATR-mode, the hot, high-pressure, fuel-rich gas from the gas generator 31 is expanded through a turbine to generate the shaft power required to drive the compressor. Expansion can occur through either the turbine wheel 69 used for turbojet/afterburning mode or through a separate turbine dedicated for use in ATR mode (not shown). Activation of the gas generator 31 to produce hot, fuel rich gas is preferably controllable with the gas generator 31 being throttleable with respect to the flow rate of gas produced. The gas generator is preferably capable of being repeatably activated and inactivated during flight.

An Overjet operating in ATR mode sets flowrate, pressure, temperature, and constituents of the gas from the gas generator 31 and the geometry of nozzle 16 such that the shaft power generated by expansion over the turbine 14 results in the delivery of air from the compressor 19 at the same flowrate and pressure ratio as in turbojet or afterburner mode. The flowrate, pressure, temperature, and constituents of the gas from the gas generator 31 are also set such that the fuel content, fuel flowrate, and air flowrate provide the heat release rate, temperature, and total flowrate needed to meet engine thrust and specific impulse requirements.

When transitioning from turbojet mode to ATR mode, the fuel supply 11 to the combustor 12i is reduced and the gas generator 31 is activated to provide hot, fuel rich gas to drive the turbine 14 and to be combusted in the afterburner/main combustor 32 with the fuel supply to the combustor 12i ultimately stopping. Transitioning from ATR mode to turbojet mode operates in the reverse. It is also possible to activate the gas generator 31 while fuel is supplied to the combustor 12i to produce additional thrust. When transitioning between afterburning turbojet mode to ATR mode, the fuel supply 11 to the combustor 12i and afterburner/main combustor 32 is reduced and the gas generator 31 is activated to provide hot, fuel rich gas to drive the turbine 14 and to be combusted in the afterburner/main combustor 32 with the fuel supply to the combustor 12i and afterburner/main combustor 32 ultimately stopping. It is also possible to activate the gas generator 31 while fuel is supplied to the combustor 12i and to the afterburner/main combustor 32 to produce additional thrust.

Figure 6:
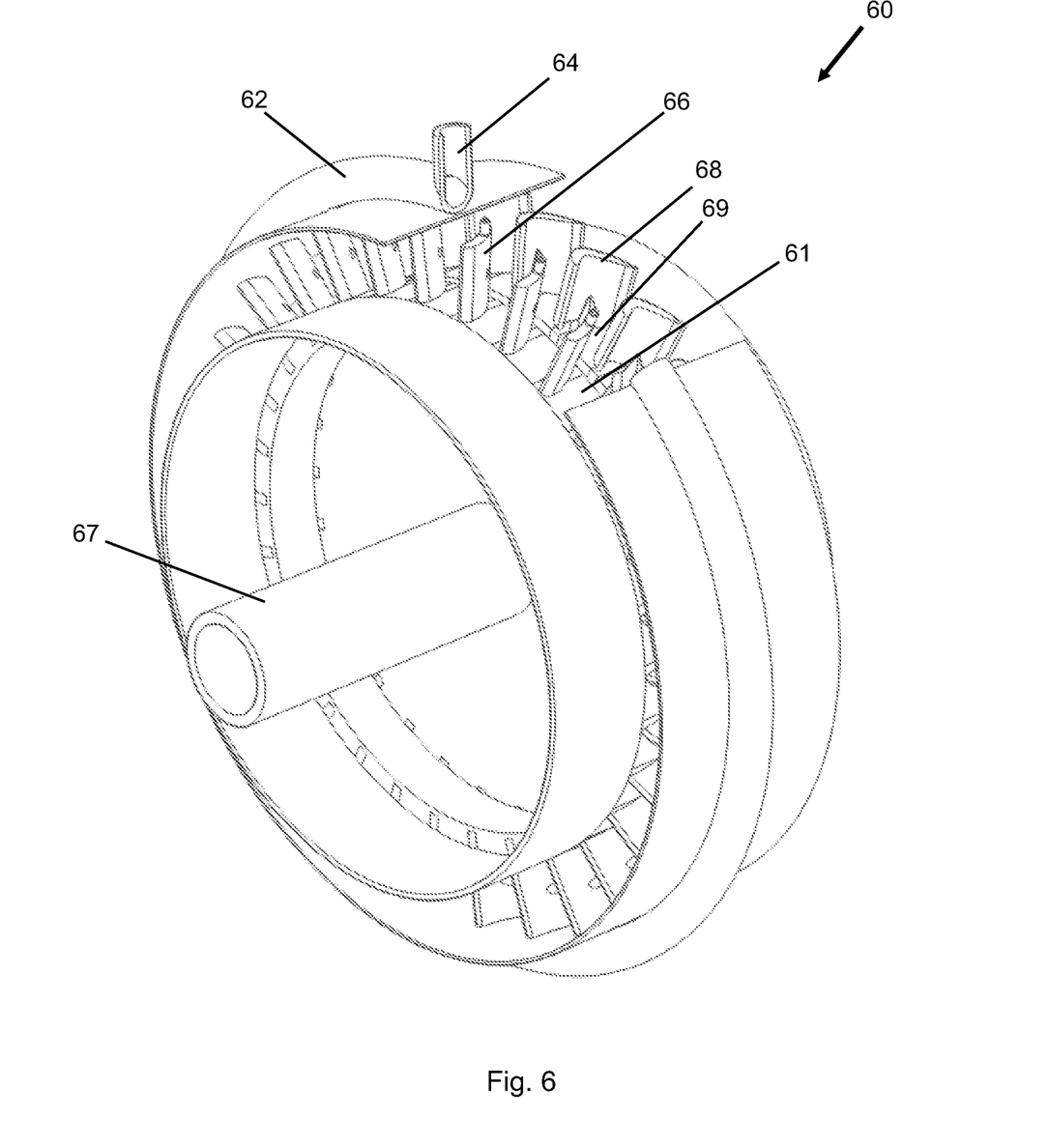
FIG. 6 is a perspective, cut away view of a turbine assembly comprising Duplex Turbine Guide Vanes (DTVGs) and turbine blades.
Figure 7:
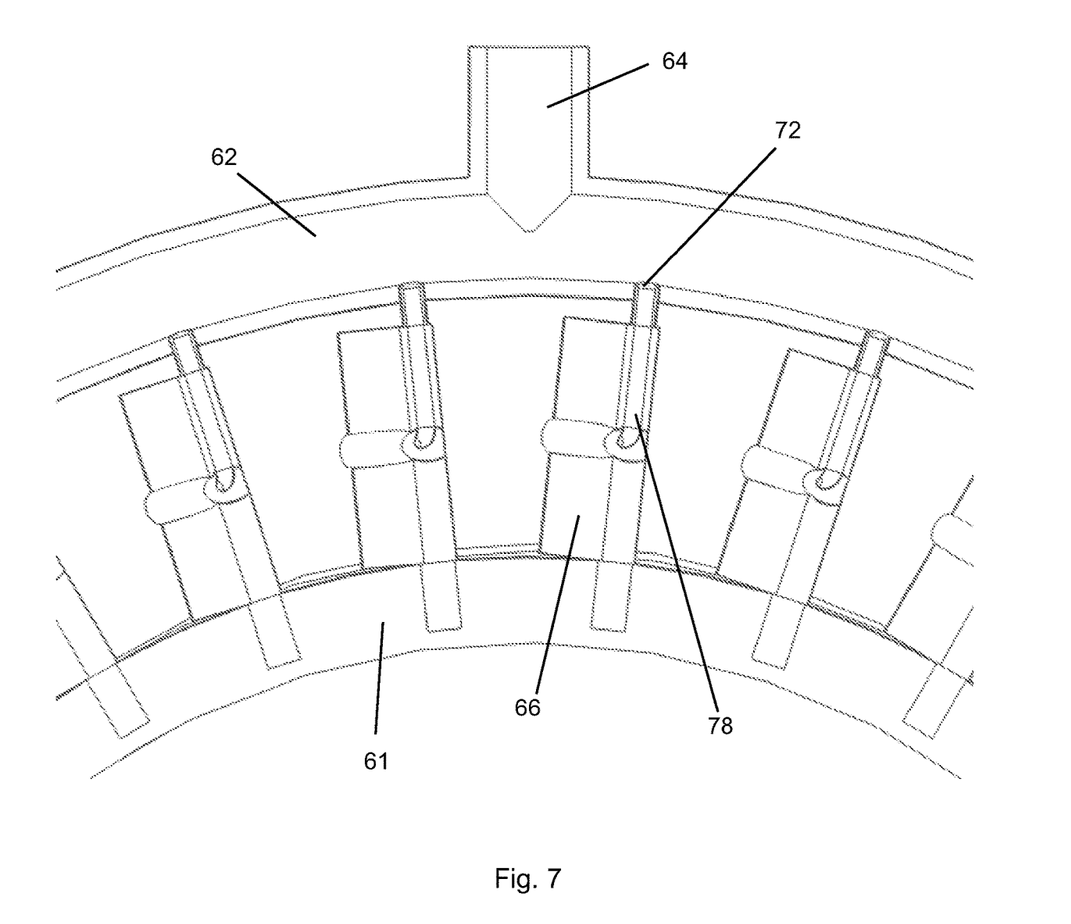
FIG. 7 is a magnified, cross-sectional view of a turbine inlet guide comprising DTGVs.
Figure 8A:
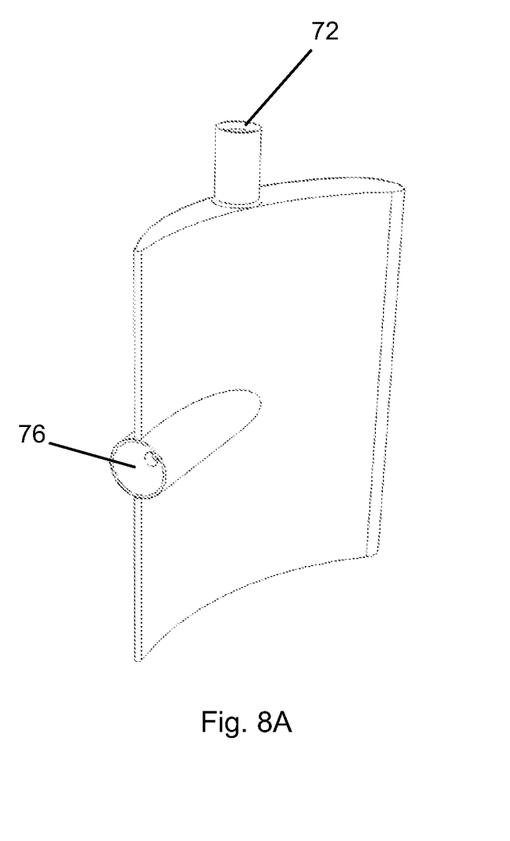
FIGS. 8A and 8B are exterior and cross-section views of an embodiment of a DTGV.
Figure 8B:
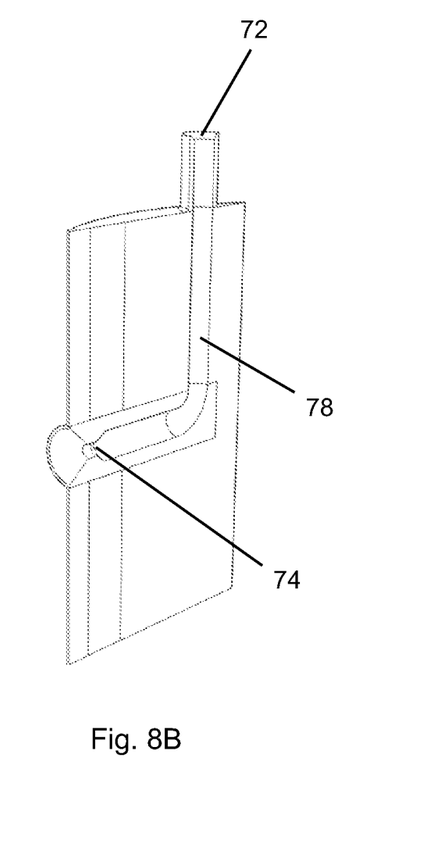
Figures 9A, 9B:
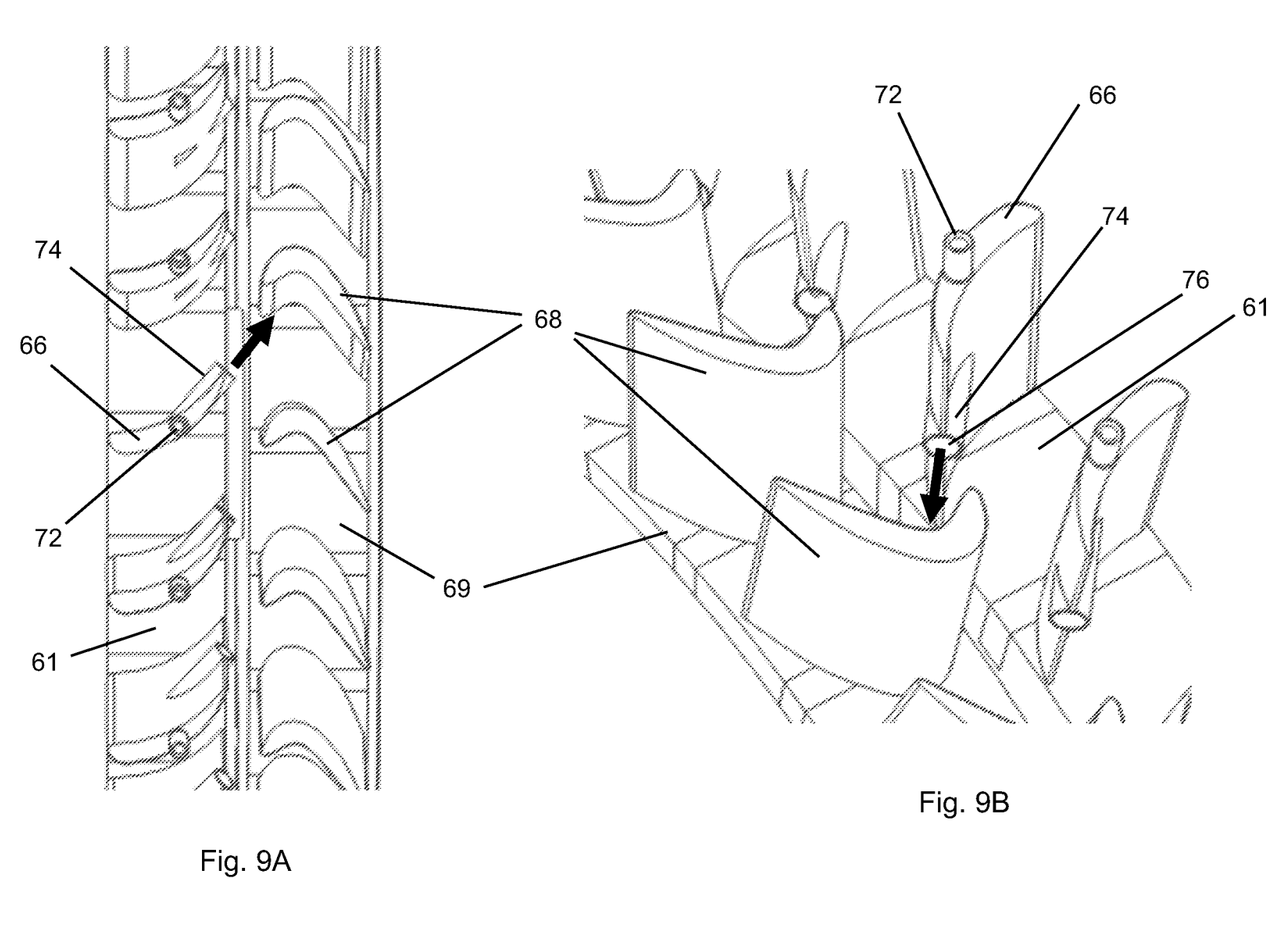
FIGS. 9A and 9B are side and perspective views of DTGVs and turbine blades.

The turbine or turbine assembly 14 of an Overjet comprises a means for directing hot, fuel rich gas from a gas generator 31 onto the blades 68 of the turbine 14 to rotate a turbine shaft 67 to transfer power to the compressor 19. Although a number of configurations are possible, one embodiment of such a means is shown in FIGS. 6 and 7. A Duplex Turbine Guide Vane (DTGV) turbine assembly 60 comprises a rotatable turbine wheel 69 with turbine blades 68 connected to a turbine shaft 67 that is configured to drive the Overjet compressor 19. A gas effluent manifold 62 is for connection to the gas delivery conduit 36 configured to receive hot, fuel-rich gas from the gas generator 31 through a gas manifold inlet 64. The gas effluent manifold 62 is configured to conduct the hot gas into DTGVs 66 that direct jets of hot, fuel-rich gas (bold arrows in FIGS. 9A and 9B) toward the turbine blades 68 on the rotatable turbine wheel 69. The DTGVs 66 comprise internal channels 78 with inlets 72 (FIGS. 7 and 8B) for receiving gas from the effluent manifold 62 and outlets 76 (FIGS. 8A and 9B) for delivering jets of gas toward the turbine blades 68. The internal channels 78 may comprise choked or unchoked nozzles 74 (FIG. 8B) for directing and accelerating effluent gas toward the turbine blades 68.

While the figures show all guide vanes on guide ring 61 are DTGVs 66 comprising inlets 72, internal channels 78, and nozzles 74, it is understood that less than all of the guide vanes, for example alternating guide vanes or every third or fourth guide vane may be DTGVs for delivering jets of gas toward the turbine blades 68. To minimize stress on the turbine wheel and turbine blades, it is preferable for the jets of hot, fuel rich gas to be distributed evenly over the turbine wheel 69. It is also preferable for there to be at least four evenly spaced DTGVs 66 among the guide vanes on the guide vane ring 61.

While the figures show particular cross-sectional shapes and sizes, it is understood that the inlets 72, internal channels 78, outlets 76, and nozzles 74 may have different cross-sectional dimensions and shapes, including variable cross-sectional sizes and shapes and that the cross-sectional shapes and sizes may be variable between guide vanes. A larger cross-sectional area for the internal channels 78 and associated inlets and outlets provides for a lower pressure drop as gas passes through the DTGVs 66 but also applied greater stress onto the turbine blades 68. The number of DTGVs 66 and cross-sectional areas of the internal channels 78 and associated inlets and outlets may be optimized for different sizes and configurations of turbines 14.

The DTGVs 66 shown in the figures all have the same size and shape but the sizes and shapes of the DTGVs may be different and the sizes and/or shapes of DTGVs and non-DTGV guide vanes may be different. For example, DTGVs may be larger than and have a different shape than non-DTGV guide vanes on the guide vane ring 61.

While the turbines and turbine assemblies 14 shown in the figures comprise a single turbine guide vane ring 61 and a single rotatable turbine wheel 69, it is understood that a turbine assembly may comprise multiple guide vane rings 61 and/or multiple rotatable turbine wheels 69.

When operating in turbojet or afterburner mode, the external airfoil shape of the DTGVs act as conventional turbine inlet guide vanes by turning the hot gas exiting the combustor towards the turbine blades on the turbine wheel, thereby enabling the turbine wheel to generate shaft power. When operating in ATR mode, hot, high-pressure gas from the gas generator 31 enters the inlets 72 at the top of DTGV, passes through the nozzle outlets 76, and impinges on the turbine blades 68 on the turbine wheel 69 to generate shaft power.

Retrofitting or modifying an afterburning turbojet to produce an Overjet capable of operating in an ATR mode comprises connecting a gas generator 31 to the turbine 14 and modifying the turbine engine to replace the conventional turbine inlet guide vanes with DTGVs or conceptually similar turbine drive components. For example, the turbine assembly 14 may be modified by providing the guide vane ring 61 and rotatable turbine wheel 69 with an effluent manifold 62 comprising nozzles configured to create jets of flowing hot, fuel rich gas onto the turbine blades 68. The effluent manifold 62 and nozzles provide a means for directing hot, fuel rich gas from a gas generator 31 onto the blades 68 of the turbine 14. The nozzles may be positioned between at least some of the turbine guide vanes on the guide vane ring 61.

Retrofitting a turbojet to produce an Overjet capable of operating in an afterburning mode or ATR mode comprises the same modifications as those to modify an afterburning turbojet as well as the addition of an afterburner and nozzle.

For the modified turbojet or afterburning turbojet to be capable of switching between turbojet, afterburner, and overjet or ATR modes, the turbojet engine is further provided with controls and valves configured for controlling the fuel supply 11 to the combustor 12i and optionally the afterburner/main combustor 32 to reduce and halt combustion the fuel in the combustor 12i and optionally the afterburner/main combustor 32 as the engine transitions to ATR mode or optionally ATR plus afterburner mode.

The invention claimed is:

1. A turbojet engine capable of operation in a turbojet mode or an Air Turbo Rocket (ATR) mode or a combination thereof, said turbojet engine comprising:
   an air inlet;
   a compressor;
   a turbine assembly, said turbine assembly comprising a rotatable turbine wheel comprising turbine blades, a non-rotating guide vane ring comprising guide vanes, and a turbine shaft configured to power said compressor; and
   a first combustor located between the compressor and the turbine assembly, said first combustor configured to burn fuel from a fuel supply in compressed air from the compressor when operating in said turbojet mode to generate combustion products that expand through the turbine assembly to provide shaft power to drive the compressor;
   a gas generator configured to generate a hot, fuel rich gas; and
   a second combustor positioned downstream of the turbine assembly and configured to combust said hot, fuel rich gas in air compressed by said compressor when operating in said ATR mode,
   wherein said hot, fuel rich gas from the gas generator is directed onto the turbine blades and wherein the turbojet engine is configured for transitioning between said turbojet mode in which the gas generator is inactive and fuel is supplied to the first combustor and said ATR mode in which the gas generator is active and no fuel is supplied to the first combustor.

2. The turbojet engine of claim 1, wherein the turbojet engine is further capable of transitioning to and from operation in an afterburning turbojet mode and
   wherein said engine is configured to provide fuel to the first combustor and the second combustor from said fuel supply when operating in said afterburning turbojet mode.

3. The turbojet engine of claim 1, wherein said turbine assembly further comprises a gas effluent manifold configured for receiving gas from the gas generator and to deliver said hot, fuel rich gas to nozzles configured to create jets of said hot, fuel rich gas onto the turbine blades.

4. The turbojet engine of claim 1, wherein said turbine assembly further comprises a gas effluent manifold configured for receiving gas from the gas generator and to deliver said hot, fuel rich gas to internal channels in the guide vanes, each internal channel comprising an inlet for receiving said hot, fuel rich gas into the internal channel and an outlet configured to deliver a jet of said hot, fuel rich gas toward the turbine blades.

5. The turbojet engine of claim 4, wherein said outlet of each internal channel comprises a choked or unchoked nozzle for directing and accelerating said gas toward the turbine blades.

6. The turbojet engine of claim 4, wherein said gas effluent manifold is positioned annularly in apposition to the non-rotating guide vane ring and said inlet of each internal channel is located on a radially facing surface of a respective one of the guide vanes.

7. The turbojet engine of claim 1, wherein the gas generator is throttleable.

8. The turbojet engine of claim 1, further comprising a gas delivery conduit that delivers the hot, fuel rich gas from the gas generator to the turbine assembly.

9. A method for modifying a turbojet engine to make said turbojet engine capable of operating in a first turbojet mode or an Air Turbo Rocket (ATR) mode or both, said turbojet engine comprising a compressor, a rotatable turbine wheel comprising turbine blades, a non-rotating guide vane ring comprising guide vanes, a turbine shaft configured to power said compressor, and a first combustor located between the compressor and the non-rotating guide vane ring, said method comprising:
   providing a gas generator configured to produce a hot, fuel rich gas;
   connecting an effluent gas manifold to said gas generator to receive said hot, fuel rich gas;
   connecting said effluent gas manifold to a means for directing said hot, fuel rich gas onto the turbine blades;
   positioning a second combustor aft of the rotatable turbine wheel and configuring the second combustor to combust said hot, fuel rich gas in air compressed by said compressor when the turbojet engine is operating in said ATR mode; and
   providing the turbojet engine with controls configured to control a fuel flow into the first combustor and operation of the gas generator to transition between said first turbojet operating mode in which the gas generator is inactive and fuel is supplied to the first combustor and said ATR mode in which the gas generator is active and no fuel is supplied to the first combustor.

10. The method of claim 9, further comprising connecting the second combustor to provide a controllable fuel flow into the second combustor and providing the turbojet engine with controls capable of controlling the fuel flow into the second combustor to transition between said first turbojet operating mode and an afterburning turbojet mode and between operating in said ATR mode and said afterburning turbojet mode.

11. The method of claim 9, wherein said means for directing said hot, fuel rich gas from the gas generator onto the turbine blades comprises nozzles configured to create jets of said hot, fuel rich gas onto the turbine blades.

12. The method of claim 9, wherein said means for directing said hot, fuel rich gas from the gas generator onto the turbine blades comprises internal channels in the guide vanes, each internal channel comprising an inlet for receiving said hot, fuel rich gas into the internal channel and an outlet configured to deliver a jet of said hot, fuel rich gas toward the turbine blades.

13. The method of claim 12, further comprising removing the non-rotating guide vane ring comprising said guide vanes and replacing the non-rotating guide vane ring comprising said guide vanes with a non-rotating guide vane ring comprising guide vanes comprising said internal channels.

14. The method of claim 12, further comprising replacing at least some of the guide vanes with said guide vanes comprising said internal channels.

15. A method for modifying an afterburning turbojet engine to make said afterburning turbojet engine capable of operating in a first turbojet mode, an afterburning turbojet mode, an Air Turbo Rocket (ATR) mode or any combination of these, said turbojet engine comprising a compressor, a rotatable turbine wheel comprising turbine blades, a non-rotating guide vane ring comprising guide vanes, a turbine shaft configured to power said compressor, a combustor located between the compressor and the non-rotating guide vane ring, and an afterburner, said method comprising:

provizing a gas generator configured to produce a hot, fuel rich gas;

connecting an effluent gas manifold to said gas generator to receive said hot, fuel rich gas;

connecting said effluent gas manifold to a means for directing said hot, fuel rich gas onto the turbine blades to combust said hot, fuel rich gas in air compressed by said compressor in the afterburner when the turbojet engine is operating in said ATR mode; and providing the turbojet engine with controls configured to control a fuel flow into the combustor and operation of the gas generator to transition between said first turbojet operating mode in which the gas generator is inactive and fuel is supplied to the combustor and said ATR mode in which the gas generator is active and no fuel is supplied to the combustor and between said afterburning turbojet mode and said ATR mode.

16. The method of claim 15, wherein said means for directing said hot, fuel rich gas from the gas generator onto the turbine blades comprises nozzles configured to create jets of said hot, fuel rich gas onto the turbine blades.

17. The method of claim 15, wherein said means for directing said hot, fuel rich gas from the gas generator onto the turbine blades comprises internal channels in the guide vanes, each internal channel comprising an inlet for receiving said hot, fuel rich gas into the internal channel and an outlet configured to deliver a jet of said hot, fuel rich gas toward the turbine blades.

18. The method of claim 17, further comprising removing the non-rotating guide vane ring comprising said guide vanes and replacing the non-rotating guide vane ring comprising said guide vanes with a non-rotating guide vane ring comprising guide vanes comprising said internal channels.

* * * * *